(12) United States Patent
Wolf et al.

(10) Patent No.: US 9,992,364 B2
(45) Date of Patent: Jun. 5, 2018

(54) DOCUMENT SCANNING DEVICE HAVING A DOCUMENT BED

(71) Applicant: Bundesdruckerei GmbH, Berlin (DE)

(72) Inventors: Andreas Wolf, Jena (DE); Martin Cobernuss, Hannover (DE); Uwe Rabeler, Hannover (DE)

(73) Assignee: Bundesdruckerei GmbH, Berlin (DE)

( * ) Notice: Subject to any disclaimer, the term of this patent is extended or adjusted under 35 U.S.C. 154(b) by 0 days. days.

(21) Appl. No.: 14/420,705

(22) PCT Filed: Jul. 12, 2013

(86) PCT No.: PCT/EP2013/064837
§ 371 (c)(1),
(2) Date: Feb. 10, 2015

(87) PCT Pub. No.: WO2014/023514
PCT Pub. Date: Feb. 13, 2014

(65) Prior Publication Data
US 2015/0207946 A1 Jul. 23, 2015

(30) Foreign Application Priority Data
Aug. 10, 2012 (DE) .................. 10 2012 214 280

(51) Int. Cl.
*H04N 1/04* (2006.01)
*H04N 1/00* (2006.01)
*G06K 9/20* (2006.01)
*G06K 9/32* (2006.01)
*G07D 7/00* (2016.01)
*G07D 7/128* (2016.01)
*G07D 7/17* (2016.01)

(52) U.S. Cl.
CPC ....... *H04N 1/00519* (2013.01); *G06K 9/2081* (2013.01); *G06K 9/32* (2013.01); *G07D 7/00* (2013.01); *G07D 7/128* (2013.01); *G07D 7/17* (2017.05); *H04N 1/00567* (2013.01); *H04N 1/00729* (2013.01); *G06K 2209/01* (2013.01)

(58) Field of Classification Search
CPC .......... H04N 1/00519; H04N 1/00567; H04N 1/00729; G06K 9/2081
USPC ................................. 358/474, 498, 497, 496
See application file for complete search history.

(56) References Cited

U.S. PATENT DOCUMENTS 5,594,830 A * 1/1997 Winston et al. ............. 385/146
5,754,713 A * 5/1998 Deguchi .............. H04N 1/1013
358/452

(Continued)

FOREIGN PATENT DOCUMENTS

EP 1 998 299 * 3/2008 ............. G07F 17/42
EP 1921838 A2 5/2008
(Continued)

*Primary Examiner* — Houshang Safaipour
(74) *Attorney, Agent, or Firm* — Wiggin and Dana LLP; Gregory S. Rosenblatt; Jonathan D. Hall

(57) ABSTRACT

The invention relates to a document scanning device having a document bed for placement of an identification document, a detection apparatus for detecting an actual position of the identification document on the document bed and a display apparatus for displaying a reference to the target position of the identification document on the document bed.

12 Claims, 3 Drawing Sheets

(56) References Cited

U.S. PATENT DOCUMENTS

| | | | | |
|---|---|---|---|---|
| 5,854,670 | A * | 12/1998 | Yong | G03G 15/60 355/23 |
| 6,101,291 | A * | 8/2000 | Arney | G03G 15/605 358/488 |
| 6,345,763 | B1 * | 2/2002 | Matsuda | H04N 1/00708 235/459 |
| 7,050,106 | B2 * | 5/2006 | Nagano | H04N 1/195 348/333.01 |
| 7,154,642 | B2 * | 12/2006 | Lichtfuss | H04N 1/00127 358/474 |
| 8,016,412 | B2 * | 9/2011 | Kawai | B41J 29/02 347/108 |
| 2003/0231367 | A1 * | 12/2003 | Quintana | H04N 1/0035 358/527 |
| 2010/0135707 | A1 | 6/2010 | Moore | |
| 2010/0245597 | A1 | 9/2010 | Pai et al. | |
| 2011/0228347 | A1 * | 9/2011 | Kohara | G03G 15/36 358/446 |

FOREIGN PATENT DOCUMENTS

| | | | |
|---|---|---|---|
| EP | 1998299 | A2 | 12/2008 |
| EP | 2388735 | A2 | 11/2011 |
| GB | 2378073 | A | 1/2003 |
| GB | 2391129 | A | 1/2004 |

* cited by examiner

DOCUMENT SCANNING DEVICE HAVING A DOCUMENT BED

FIELD

The present invention relates to a document scanning device, in particular a document scanning device for detecting data of an identification document.

BACKGROUND

In national security-relevant areas, for example at airports, the identity of a traveler needs to be checked several times. To this end, identification control points of a control system, for example a border control system, are usually distributed through the area.

In order to detect identity data, each identification control point has a document scanning device which scans the identity data, for example a name of the person, with the aid of an identification document.

A conventional document scanning device comprises a document bed, on which an identification document can be placed for data detection. The document bed is conventionally light transparent, so that the camera arranged below the document bed can optically detect the identification document. To this end, the identification document may be illuminated by means of infrared or ultraviolet light.

In order to scan data of an identification document, for example of a passport, the latter is in particular placed folded open in a well-defined way onto the document bed, which is formed by a glass plate. Below the document bed there is a camera, as well as, for example, a white-light, ultraviolet-light or infrared luminous means, which illuminates the identification document with light of a predetermined wavelength. In order to scan the camera data and control the luminous means, it is for example possible to use a processor which, for example, can detect the authenticity of the document and, for example, output a corresponding signal, when there is correct positioning of a data page of an identification document on a document bed. If the identification document is for example placed on the document bed in a rotated fashion, however, detection errors may arise which make verification of the authenticity of an identification document more difficult.

One disadvantage of the known document scanning devices is that they can usually be operated reliably only by trained personnel. This is because the identification documents usually need to be placed on the document beds in a very particular way, for example aligned straight, so that error-free data detection can be carried out. Error-free self-operation of document scanning devices by untrained personnel, for example travelers, is therefore not readily possible. Self-operation of the document scanning devices by passengers is, however, desirable, for example in order to allow faster border crossing or faster clearance of individuals in an airport.

Another disadvantage of the known document scanning devices is their sensitivity to stray light. This is because, in the event of stray light incident on the transparent document bed, and therefore in a camera detection region, optical features of an identification document, for example ultraviolet features, cannot be detected reliably.

It is therefore an objective of the present invention to provide a more efficient document scanning device, which for example allows self-operation by untrained users.

BRIEF SUMMARY

This objective is achieved by the features of the independent claim. Further embodiments are the subject matter of the dependent claims, the description and the drawings.

The invention is based on the discovery that this object can be achieved by automatic user guidance, in which, for example, a user is shown in real time how they should place an identification document on a document bed so that error-free data detection can be carried out.

According to one aspect, the invention relates to a document scanning device, comprising a document bed for placement of an identification document, a detection apparatus for detecting an actual position of the identification document on the document bed, and a display apparatus for displaying an indication of the setpoint position of the identification document on the document bed.

The display apparatus may for example be formed by a semitransparent display, which is arranged above the document bed. By means of the display apparatus, the user can be assisted or guided during operation of the document scanning device. If a user places an identification document incorrectly on the document bed, then, by means of the display apparatus, the measures which need to be carried out in order to achieve correct orientation or positioning of the identification document on the document bed are displayed, for example. By the user guidance by means of the display apparatus, a high acceptance of the document scanning device according to the invention may therefore be expected for users who have no previous technical knowledge.

The identification document is not part of the document scanning device. The identification document is for example an ID document, a passport, a means of payment, for example a bank card or a credit card, a driver's license, a company pass, a waybill or a proof of entitlement. In general, the identification document may also be any other document, the identity and authenticity of which are intended to be confirmed.

According to one embodiment, the display apparatus is arranged above the document bed, in such a way that the identification document can be positioned between the document bed and the display apparatus. Between the document bed and the display apparatus, a recess respectively open laterally may thus for example be formed, into which the identification document can be introduced. When the identification document is on the document bed, the display apparatus is thus arranged above the identification document so that a user of the document scanning device can look directly at the display apparatus and correct the position of the identification document on the document bed, if the actual position of the identification document differs from the setpoint position.

The setpoint position may, for example, be formed by a mechanical stop on the document bed. This prevents a user of the document scanning device from moving the identification document beyond the setpoint position, for example. Furthermore, the coordinates of the mechanical stop with respect to the orientation of the document bed are predetermined as a setpoint position. The setpoint position may, however, also exclusively be predetermined by electronic coordinates, which may be provided as a data set.

According to one embodiment, the display apparatus is arranged within a parallelism range above the document bed parallel to the document bed. The parallelism range may for example extend between 80° and 100°, or between 89° and 91°, or it may be precisely 90°. In this way, a defined range for receiving the identification document is provided.

According to one embodiment, the display apparatus is arranged tiltably with respect to the document bed. In this way, the display apparatus may for example be folded up for the identification document to be placed on the document bed, and then folded down again, which allows ergonomic operation of the document scanning device. Furthermore, the display apparatus may be tilted toward the user, so that the readability can be improved.

According to one embodiment, the display apparatus is light transparent, at least partially light transparent, in particular light semitransparent or light nontransparent.

According to one embodiment, the display apparatus may for example have an electrically modifiable light transparency. The light transparency may, for example, be adjustable as a function of an electric voltage. Thus, for example, the display apparatus may be at least partially transparent in the event of a deviation of the setpoint position from the actual position, for example with only up to 40% of the light being transmitted. This makes the user capable of seeing the position of the identification document on the document bed, and correcting it according to indications by the display apparatus. In the event of a match of the setpoint position with the actual position, the display apparatus may for example darken and become light nontransparent, so that even greater shading from extraneous light can be achieved. This can lead to a reduction in the scanning error rate, since the display apparatus at least partially shields the document bed against extraneous light. The extraneous light is that extraneous light which is not generated by the document scanning device for optical detection of the identification document.

The term "light transparency" relates according to one embodiment to the white ambient light or sunlight, and not necessarily to ultraviolet light or infrared light. In this way, a user of the document scanning device can be protected from ultraviolet light or infrared light, which may be used for optical detection of the identification document. If the display apparatus is light transparent, then it causes no light attenuation. If the display apparatus is at least partially light transparent, or light semitransparent, then it is for example up to 40% transmissive for white ambient light. In this way, blocking against extraneous light is achieved, which can be advantageous particularly when checking ultraviolet security features, in order to determine defined light conditions for an ultraviolet light signal. The display apparatus may, for example, be configured as a transparent or semitransparent display. One advantage of light transparency, or at least partial light transparency, in particular light semitransparency, is that a user of the document scanning device can see his own hand without interruption. This can lead to even greater acceptance of the document scanning device by untrained users. Furthermore, the display apparatus can achieve shading from extraneous light, which is advantageous when checking ultraviolet security features, because daylight can mask ultraviolet fluorescences.

According to one embodiment, the display apparatus is configured as a display, in particular a semitransparent display. The display may have a light-emitting diode (LED) or an organic light-emitting diode (OLED) or a sheet with LED or OLED light elements.

According to one embodiment, the display apparatus comprises at least one luminous element, for example a light-emitting diode (LED) or an organic light-emitting diode (OLED) or a liquid-crystal display (LCD).

According to one embodiment, the document bed is provided with a mechanical stop which defines the setpoint position of the identification document on the document bed.

According to one embodiment, the display apparatus is configured in order to display a movement pattern for reaching the setpoint position. The movement pattern may for example display folding open a passbook, which may be an identification document. In general, the movement pattern may display moving images, in order to show a user the measures required to ensure detection of security features or to recognize documents, or in order to prompt the user to carry out actions.

According to one embodiment, the display apparatus is provided with a first polarization filter for transmitting light of a first polarization. The document bed may be provided with a second polarization filter for transmitting light of a second polarization. The first polarization and the second polarization are preferably different, and differ for example by an angle of 90°. The effect achieved by this is that the camera arranged below the light transparent document bed can be protected by the light passing through the display apparatus. This is because the arrangement of the two polarization filters is selected in such a way that the polarization angles are different. According to one embodiment, the polarization filters are configured in order to transmit mutually perpendicular polarization angles. In this way, the light shining through the display apparatus is blocked by the two polarization filters of the document bed.

The document bed may for example be transparent, in which case the second polarization filter may be integrated into the document bed or formed as a filter layer. This may, for example, be done using a polarization layer. Then, the ambient light which passes through the e.g. semitransparent display, which may form the display apparatus, and strikes the identification document, can no longer enter the camera arranged below the document bed. The user, however, can still see his hand and the identification document, and the camera may furthermore detect the identification document by using white light, ultraviolet light and infrared light.

According to one embodiment, the display apparatus covers the document bed. To this end, the display apparatus may have dimensions such that the underlying document bed is covered. In this way, the document bed is protected against extraneous light by the display apparatus. The protective effect is increased with a decreasing transparency of the display apparatus, which may for example have a light transparency of 40%.

According to one embodiment, the document bed comprises a photoelectric barrier. The photoelectric barrier allows automatic recognition of the presence of the identification document on the document bed, so that the display apparatus may for example be prompted to optically guide the user by means of optical signals.

According to one embodiment, the detection apparatus comprises at least one optical sensor or an optical recording camera. The optical sensor or the optical recording camera may be arranged below the document bed. The detection apparatus may furthermore have a light source, for example a white light source, an ultraviolet light source or an infrared light source, in order to expose the identification document for feature detection.

According to one embodiment, the detection apparatus is configured in order to determine the actual position by means of pattern recognition on the basis of an optical recording of a feature of the identification document, in particular a contour of the identification document. To this end, the detection apparatus may have a processor. The actual position may, for example, be carried out on the basis of a digital comparison of the actual position data and of the setpoint position data. The feature of the identification document may, for example, be its geometrical shape. Thus, the contour of the identification document is for example an edge or a corner or an arrangement of corners of the identification document.

According to one embodiment, the detection apparatus is configured in order to compare the detected actual position of the identification document with the setpoint position, in order to determine a deviation between the actual position and the setpoint position. In the case of a deviation, the display apparatus may for example display a first signal or a sequence of first signals, which may have a particular color. When the setpoint position is reached by the identification document, the display apparatus may either display a second signal or a second signal sequence of another color, for example green, or it may be turned off.

According to another aspect, the invention relates to an identification control point, for example an eGate, having the document scanning device according to the invention.

According to another aspect, the invention relates to a document scanning method, comprising the following steps: detection of an actual position of the identification document on a document bed of a document scanning device, and displaying of an indication of the setpoint position of the identification document on the document bed, the indication being displayed above the identification document, in particular by means of a display apparatus. Further method steps derive directly from the functionality of the document scanning device according to the invention.

According to another aspect, the invention relates to a computer program for carrying out the document scanning method, when the computer program is run on a computer.

BRIEF DESCRIPTION OF THE DRAWINGS

Other exemplary embodiments will be explained in more detail with reference to the appended drawings, in which.

DETAILED DESCRIPTION

Figure 1:
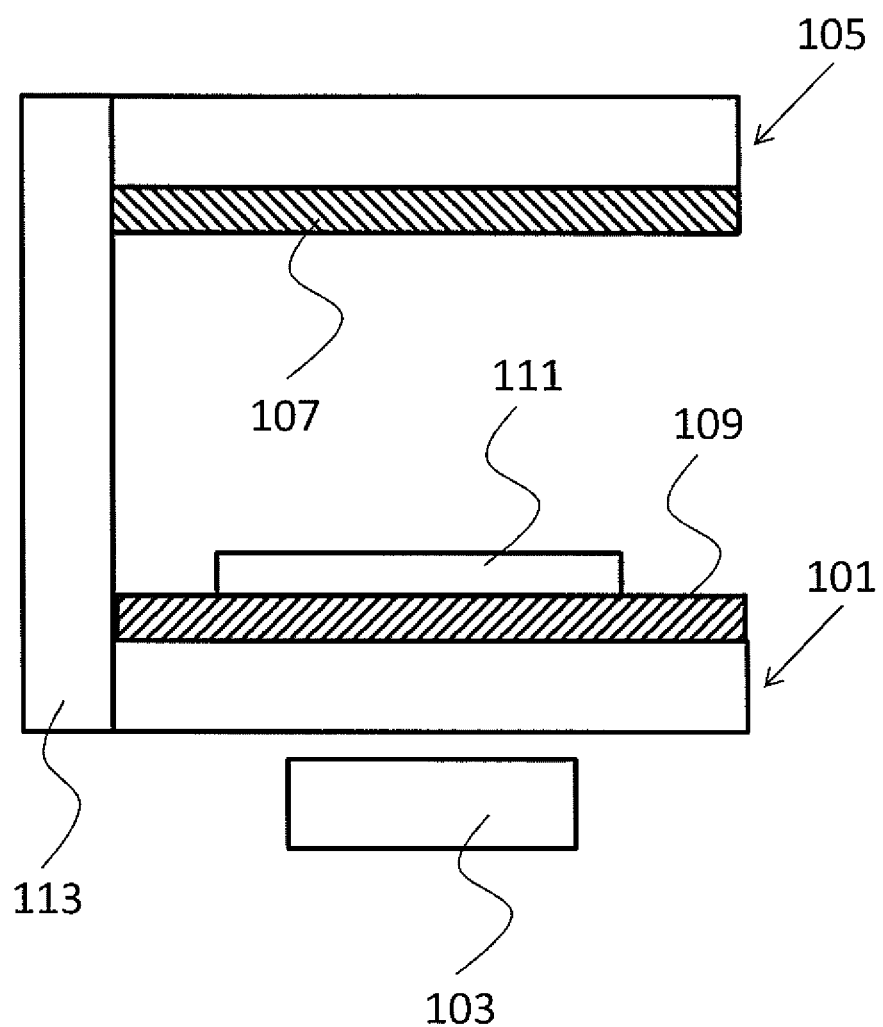
FIG. 1 shows a document scanning device according to one embodiment.

FIG. 1 schematically shows a document scanning device according to one embodiment. The document scanning device comprises a document bed 101, a detection apparatus 103 arranged below the document bed 101, and a display apparatus 105 which is arranged above the document bed 101.

The display apparatus 105 is formed, for example, as a light transparent or light semitransparent display. To this end, the display apparatus 105 may comprise luminous elements, for example light-emitting diodes, organic light-emitting diodes or liquid-crystal display elements.

The document bed 101 is, for example, made to be light transparent. To this end, the document bed 101 may be made of glass which is transmissive for the corresponding illumination spectra.

According to one optional embodiment, the display apparatus 105 is provided with a first polarization filter 107, which transmits light of a first polarization. The document bed 101 is provided with a second polarization filter 109, which transmits light of a second polarization. If the polarizations are different, then the effect of the two polarization filters 107, 109 is that light which passes through the transparent or semitransparent display apparatus 105 cannot penetrate through the document bed 101 and reach the detection apparatus 103. In this way, the detection apparatus 103 is at least partially shielded against extraneous light.

According to one embodiment, the display apparatus 105 is nontransparent in relation to UV light or IR light. In this way, the UV light or IR light which is generated in order to detect the identification document 111, for example by the detection apparatus 103, is blocked by the display apparatus 105. Thus, a user of the document scanning device is protected against UV light or IR light.

The detection apparatus 103 may, for example, comprise a camera for recording an image of the identification document 111. Furthermore, the detection apparatus 103 may have a light source, for example a white light source, one or more infrared light sources or one or more ultraviolet light sources, in order to illuminate the identification document 111 through the document bed 101.

The display apparatus 105 may be fastened by means of a holder 113 above the document bed 101, for example on a body of the document scanning device. The fastening may be rigid fastening, by which the display apparatus 105 is for example arranged parallel within the aforementioned parallelism range with respect to the document bed 101.

Figure 2:
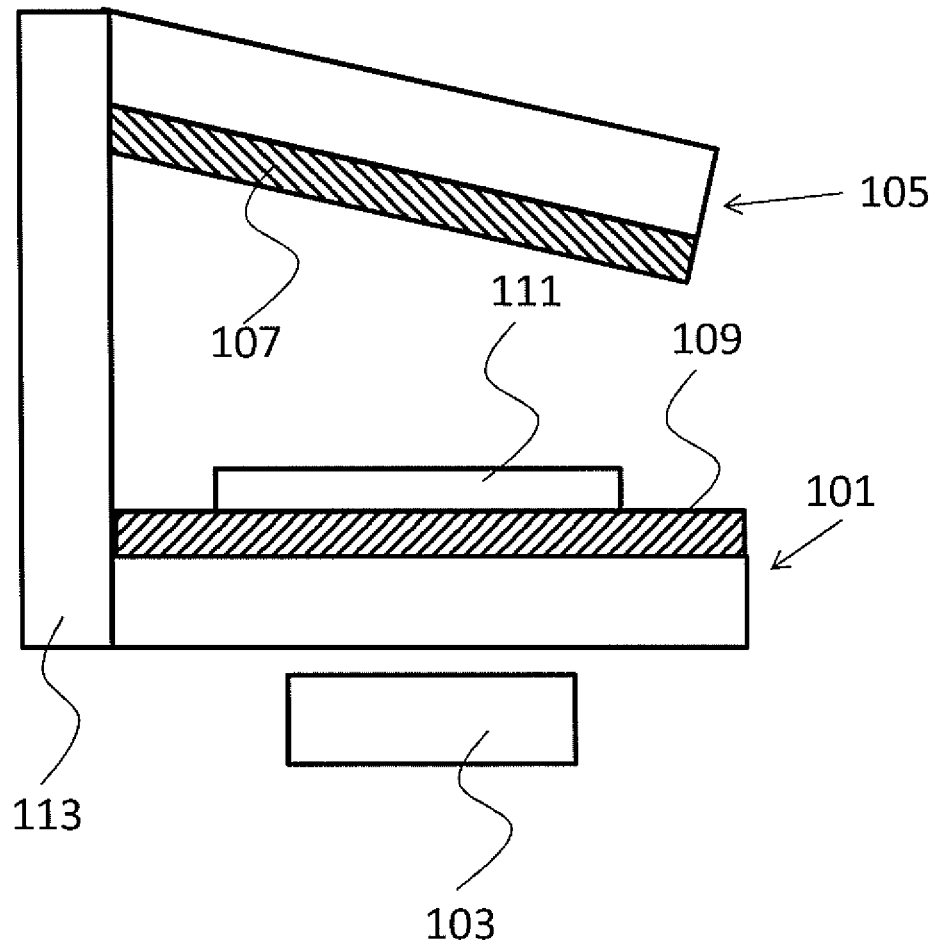
FIG. 2 shows a document scanning device according to one embodiment.

According to one embodiment, the display apparatus 105 may be mounted tiltably on the holder 113, as represented in FIG. 2. In this way, for example, it may be tilted up in order to place the identification document 111 on the document bed 101, and then tilted back down. The display apparatus 105 may furthermore be inclined in the direction of the document bed 101, which can allow ergonomic reading of the display apparatus 105.

The display apparatus 105 is preferably provided for user guidance by means of optical signals. To this end, the display apparatus 105 may be configured in order to emit optical signals which assist a user in correct positioning of the identification document 111 on the document bed 101. The optical signals may for example be produced by colored, for example green or red, arrows for user guidance or displayed movement patterns.

If an actual position of the identification document 111 differs from the desired setpoint position of the identification document 111 on the document bed 101, then the display apparatus 105 may display an indication for reaching the setpoint position. This indication may for example be carried out using a colored arrow, which indicates the further movement direction of the identification document, or using a movement pattern. In the event of a difference between the actual position and the setpoint position, the display apparatus 105 indicates for example the way in which the identification document 111 is to be placed so that the setpoint position can be reached.

The setpoint position may for example be a determined position on the document bed 101, which for example is predetermined by electronic coordinates. The setpoint position may, however, also be established by a mechanical stop.

In order to establish whether the identification document 111 has reached the setpoint position on the document bed 101, the detection apparatus 103 may for example comprise a processor, which compares the actual position with the setpoint position and drives the display apparatus 105, or its luminous elements.

Figure 3:
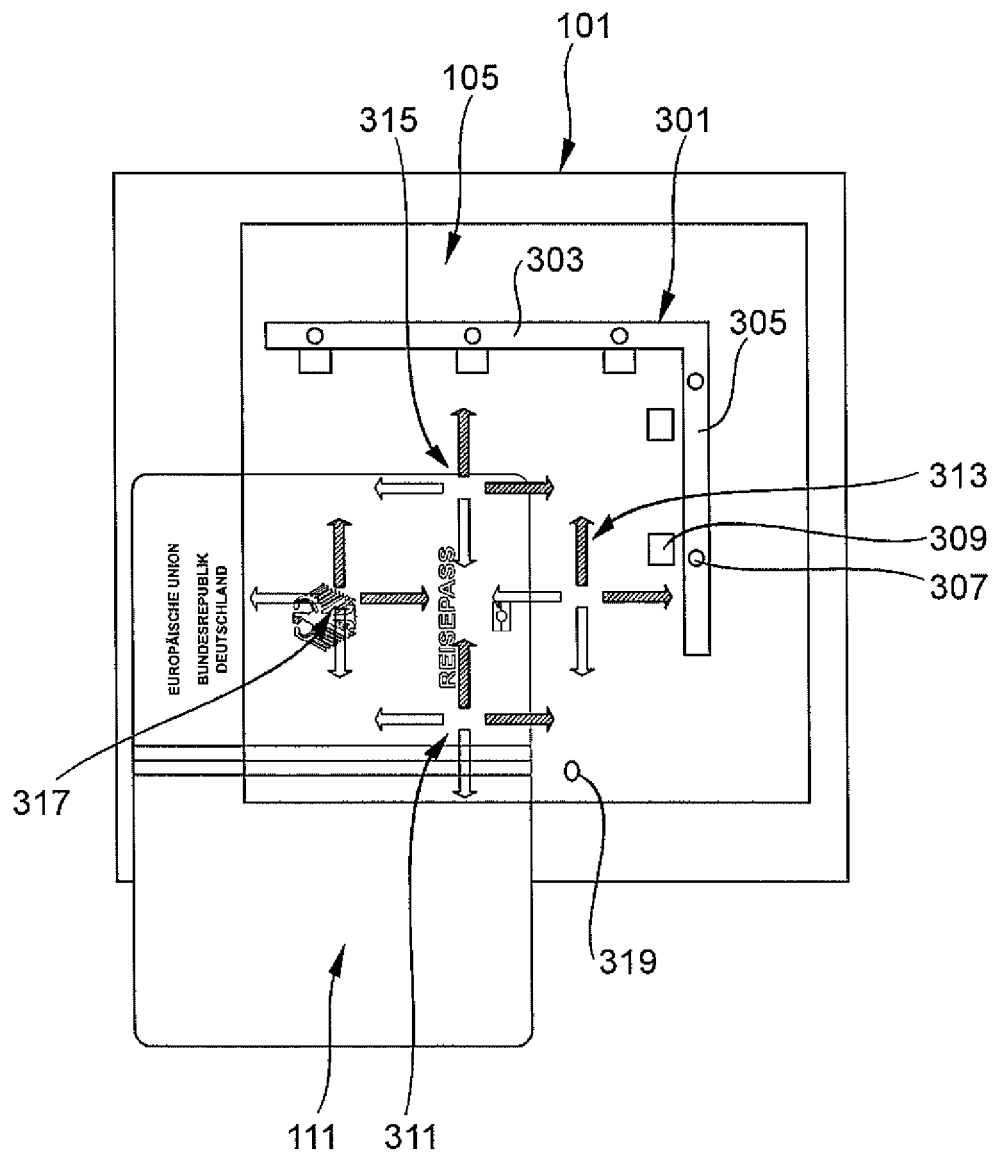
FIG. 3 shows a plan view of a document scanning device according to one embodiment.

FIG. 3 shows a plan view of a document scanning device according to one embodiment. The document scanning device shown in FIG. 3 may have the features of the document scanning device shown in FIG. 1 or in FIG. 2, and vice versa.

As represented in FIG. 3, the document bed 101 is provided with a mechanical stop 301, which for example comprises two bars 303 and 305 arranged at a right angle to one another.

Furthermore, optional luminous elements 307 for stop signaling are provided, which according to one embodiment are incorporated into the bars 303 and 305. According to another embodiment, the luminous elements 307 are arranged above the mechanical stop 301 in the display apparatus 105. The luminous elements 307 may for example be formed by light-emitting diodes.

The document bed 101 furthermore optionally comprises mechanical pressing elements 309, which are arranged for example along the bars 303, 305.

The display apparatus 105 arranged above the document bed 101 covers the document bed 101 at least partially. In order to display a difference between an actual position and a setpoint position of the identification document 111, the display apparatus 105 comprises arrow groups 311, 313, 315 and 317. Each of the arrow groups comprises four arrows, which are respectively arranged in the configuration of a coordinate system and point in different directions. The arrows of the respective arrow group are for example individually selectable or activatable for lighting. By lighting the arrows, it can be indicated to a user whether the identification document 111 should be moved more to the right, more to the left, more forward or more back.

According to one embodiment, the document bed 101 or the display apparatus 105 comprises a photoelectric barrier 319, which makes it possible to detect the identification document.

As represented in FIG. 3, the display apparatus 105 is located above or over the document bed 101, which may be formed by a support surface. The display apparatus 105 may be formed as a flat cover plate, which can be moved down on some or all sides as far as a plane of the document bed 101. On one side, an opening is provided for introducing the identification document, although depending on the application this may also be formed on two or three sides. The identification document 111 is placed on the document bed 101 and then moved in the direction of the e.g. suitably switched arrow groups 311, 313, 315, 317 incorporated in the display apparatus 105, for example as far as the mechanical stop 301. If the identification document 111 passes through the photoelectric barrier 319, for example, the detection apparatus 103, which may have an internal camera, is started so that the resting position of the identification document 111 can be calculated. In this way, a deviation between the resting position, i.e. the actual position of the identification document, and the desired setpoint position on the support surface 101 can be calculated.

According to one embodiment, the position detection may be carried out by polling of the camera with reduced resolution and/or by detection of an RFID chip, which the identification document may contain. For RFID detection, an antenna may be provided next to the document bed 101 or around the document bed 101 or integrated in the document bed 101. The antenna may, for example, have antenna wires which are applied in the document bed 101 or in the display apparatus 105.

The document scanning device represented in FIGS. 1 to 3 may be used for identification documents of different formats. When, for example, in ID-3 identification documents, the stop position, which is predetermined by the mechanical stop 301, is reached, then for example the luminous arrows of the arrow groups 311 to 317 are turned off. In the case of class ID-1 and ID-2 identification documents, however, it is sufficient for the respective identification document to be fully detected by the camera, which may be an element of the detection apparatus 103. In this case, the luminous elements 307, which are applied in the display apparatus 105 above the mechanical stop 301, may be turned on.

The optional mechanical pressing elements 309 are provided in order to fix the identification document 111 mechanically when the stop position predetermined by the mechanical stop 301 is reached. After the end of the check of the identification document 111, the mechanical pressing elements 309 are released. The user may, for example, be prompted to remove the identification document 111 by green arrows, pointing in a particular direction, of the arrow groups 311 to 317.

If the identification document 111 is incorrectly placed, for example with the data page up, then the user may likewise be prompted by corresponding arrow indication to remove the identification document.

In the case of an identification document rotated through 180°, for example, the user may for example be prompted to rotate the identification document 111 by rotating arrows of the arrow groups 311 to 317.

The optical user guidance by the luminous arrows of the arrow groups 311 to 317 may be assisted by acoustic signals. To this end, the display apparatus 105 may have at least one loudspeaker diaphragm, which can emit one or more tones.

The optical signaling provided by the display apparatus 105 may be carried out by static and/or dynamic indications. According to one embodiment, the arrows of the arrow groups 311 to 317 may indicate not only one color, for example green, but also changeable colors.

The configuration of the display apparatus 105 allows intuitive user guidance. For instance, the display apparatus 105 may be made of a plastic which is opaque for UV or IR, but transparent for visible light. The user can therefore always know the position of the identification document on the document bed 101. The display apparatus 105 may, however, be made of a material with an electrically modifiable transparency. Once the identification document 111 has been detected and is correctly placed, for example, the display apparatus may remain opaque and darkened during a checking process, in which the identification document 111 is optically detected, so that the ingress of extraneous light into the system, particularly into the camera of the detection apparatus 103, can be significantly reduced.

According to one embodiment, the display apparatus 105 may be formed from a darkly colored material, which causes for example 40% light attenuation, the transparency of which is not modifiable.

According to another embodiment, the material of the display apparatus 105 may be transmissive only for light with a small angle about an axis that extends between the document scanning device and a user, light incident from all other directions not penetrating into the display apparatus. To this end, the first polarization filter 107 as represented in FIG. 1 may be provided.

According to one embodiment, air nozzles for cleaning the document bed, for example from dust, may be built in or introduced in the mechanical stop 301.

The arrangement of the display apparatus 105, which may be a semitransparent display, directly over the document bed 101 and therefore directly over the identification document 111 is associated with the advantage that user guidance takes place directly on the identification document 111. In this way, a user receives direct feedback about the actual position with respect to the setpoint position, or with respect to setpoint movements, until the setpoint position is reached. In this way, ergonomic obstacles are reduced, which can lead to a higher detection throughput of the document scanning device.

What is claimed:

1. A document scanning device, comprising:
   a document bed for placement of an identification document;
   a detection apparatus, including a processor, for detecting an actual position of the identification document on the document bed;
   a display apparatus that is a flat panel display, including at least one luminous element, for displaying an indication of the setpoint position of the identification document on the document bed; and
   wherein the display apparatus is arranged within a parallelism range above the document bed parallel to the document bed or tiltably with respect to the document bed;
   wherein the display apparatus is arranged above the document bed, in such a way that the identification document can be positioned between the document bed and the display apparatus;
   wherein the display apparatus is configured so that when the identification document is on the document bed, the display apparatus is configured above the identification document so that a user of the document scanning device can look directly at the display apparatus and correct the position of the identification document on the document bed when the actual position of the identification document differs from the setpoint position; and
   wherein the display apparatus is affixed by means of a holder above the document bed on a body of the scanning device, wherein the affixing includes one of:
   1. rigidly fastening the display apparatus, and
   2. tiltably mounting the display apparatus on the holder, such that, between the document bed and the display apparatus, a lateral open recess is formed, into which the identification document can be introduced;
      wherein the processor of the detection apparatus compares an actual position of the identification document with the set point position and drives the flat panel display or its luminous elements.

2. The document scanning device of claim 1, wherein the display apparatus is at least partially light transparent or light nontransparent or has an electrically modifiable light transparency.

3. The document scanning device of claim 1, wherein the at least one luminous element of the display is a light-emitting diode or a liquid-crystal display.

4. The document scanning device of claim 1, wherein the display apparatus is configured in order to display a movement pattern for reaching the setpoint position.

5. The document scanning device of claim 1, wherein the display apparatus is configured in order to display a first optical pattern in the event of a deviation of the setpoint position from the actual position or a second optical pattern for user guidance in the event of a match of the setpoint position and the actual position.

6. The document scanning device of claim 1, wherein the display apparatus is provided with a first polarization filter for transmitting light of a first polarization, and wherein the document bed is provided with a second polarization filter for transmitting light of a second polarization, the first polarization and the second polarization being different.

7. The document scanning device of claim 1, wherein the document bed is provided with a mechanical stop which defines the setpoint position.

8. The document scanning device of claim 1, wherein the display apparatus at least partially covers the document bed.

9. The document scanning device of claim 1, wherein the detection apparatus comprises an optical sensor or an optical recording camera.

10. The document scanning device of claim 1, wherein the detection apparatus is configured in order to determine the actual position by means of pattern recognition on the basis of an optical recording of a feature of the identification document, in particular a contour of the identification document.

11. The document scanning device of claim 1, wherein the detection apparatus is configured in order to compare the detected actual position of the identification document with the setpoint position, in order to determine a deviation between the actual position and the setpoint position.

12. A document scanning method, comprising the steps of:
    detection using a detection apparatus having a processor of an actual position of the identification document on a document bed of a document scanning device; and
    displaying of an indication of a setpoint position of the identification document on the document bed, the indication being displayed by means of a display apparatus above the identification document, wherein the display apparatus is a flat panel display having at least one luminous element, and wherein the processor of the detection apparatus compares an actual position of the identification document with the set point position and drives the flat panel display or its luminous elements;
    wherein the display apparatus is arranged within a parallelism range above the document bed parallel to the document bed or tiltably with respect to the document bed;
    wherein the display apparatus is arranged above the document bed, in such a way that the identification document can be positioned between the document bed and the display apparatus;
    wherein the display apparatus is configured so that when the identification document is on the document bed, the display apparatus is configured above the identification document so that a user of the document scanning device can look directly at the display apparatus and correct the position of the identification document on the document bed when the actual position of the identification document differs from the setpoint position;
    wherein the display apparatus is affixed by means of a holder above the document bed on a body of the scanning device, wherein the affixing includes one of:
    1. rigidly fastening the display apparatus, and
    2. tiltably mounting the display apparatus on the holder, such that, between the document bed and the display apparatus, a lateral open recess is formed, into which the identification document can be introduced.

* * * * *